Oct. 25, 1932.  W. H. DAILY  1,885,005
AUTOMATIC PHONOGRAPH
Filed Aug. 13, 1926  9 Sheets-Sheet 1

Oct. 25, 1932.  W. H. DAILY  1,885,005
AUTOMATIC PHONOGRAPH
Filed Aug. 13, 1926   9 Sheets-Sheet 2

Witnesses
Harry C. White
William P. Kilroy

Inventor
William H. Daily
By Edward Fay Wilson
atty.

Oct. 25, 1932.   W. H. DAILY   1,885,005
AUTOMATIC PHONOGRAPH
Filed Aug. 13, 1926   9 Sheets-Sheet 3
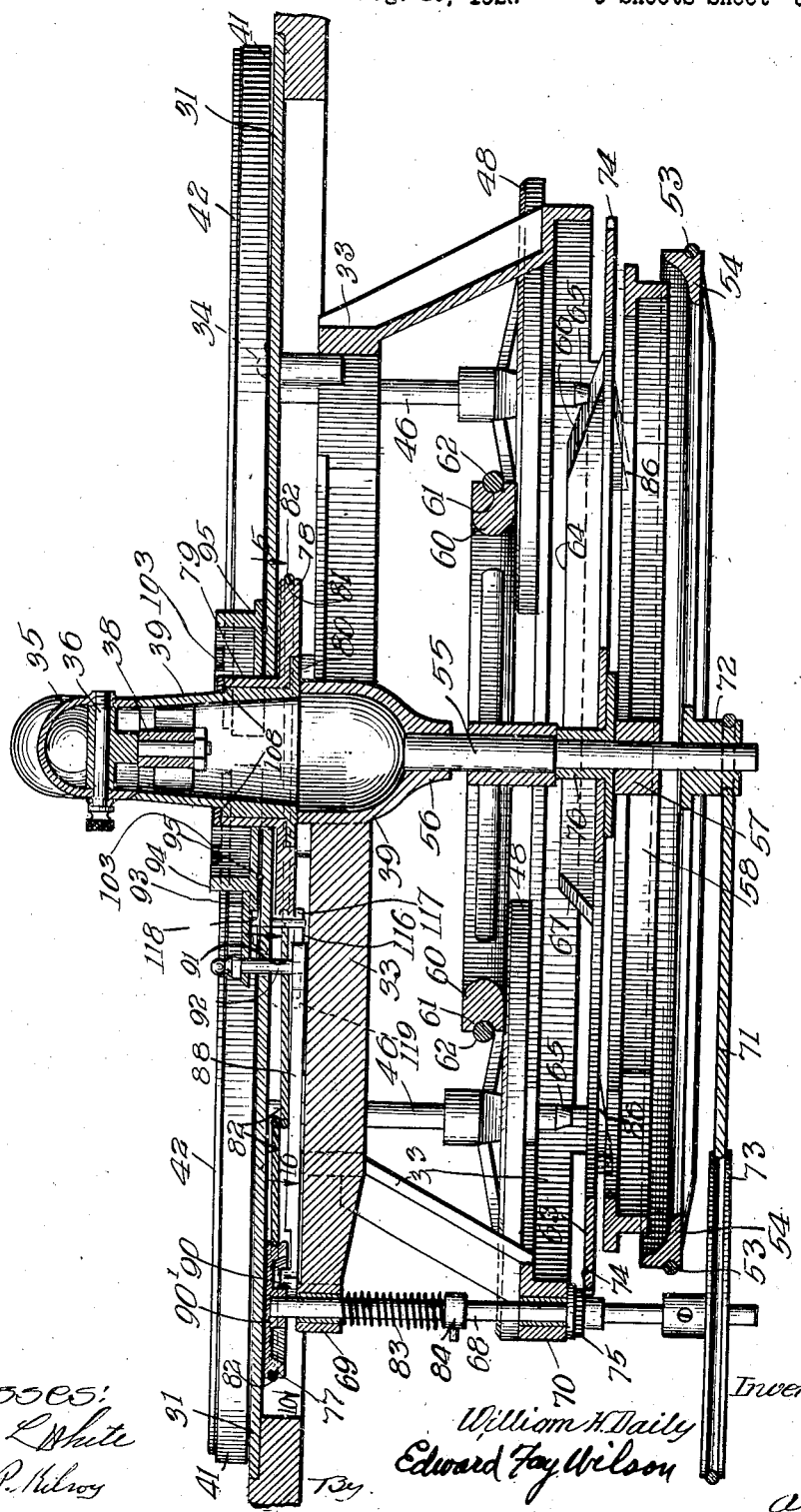

Oct. 25, 1932.  W. H. DAILY  1,885,005
AUTOMATIC PHONOGRAPH
Filed Aug. 13, 1926  9 Sheets-Sheet 4
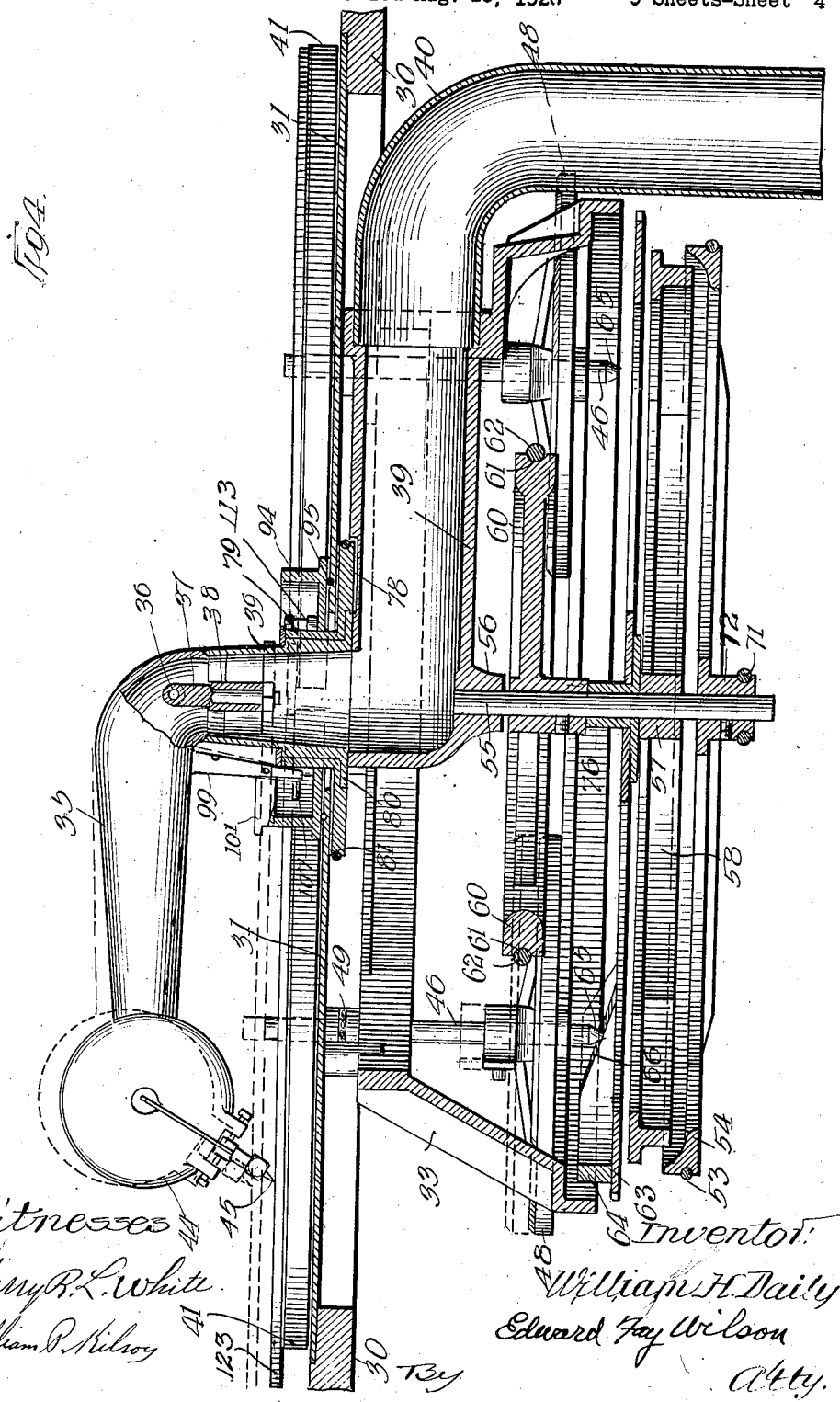
Witnesses
Harry R. L. White
William P. Kilroy
Inventor:
William H. Daily
Edward Fay Wilson
By
Atty.

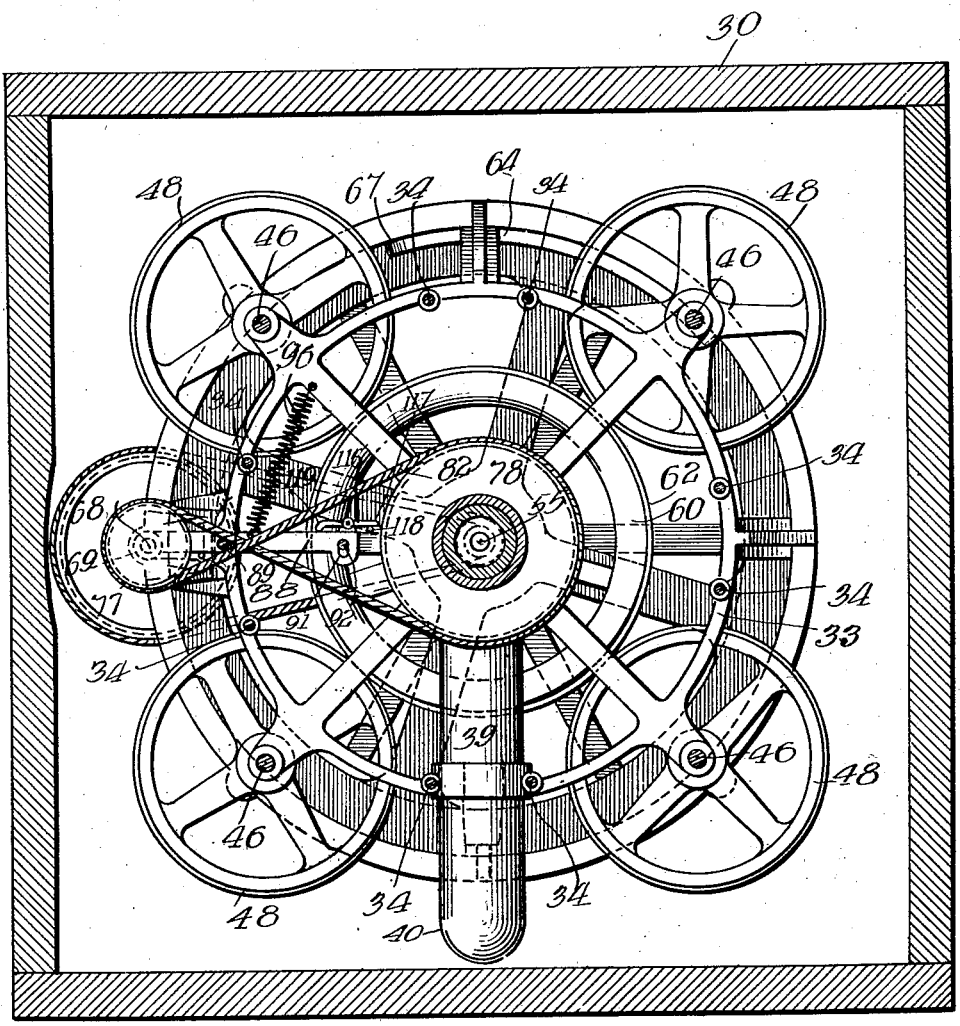

Oct. 25, 1932.   W. H. DAILY   1,885,005
AUTOMATIC PHONOGRAPH
Filed Aug. 13, 1926   9 Sheets-Sheet 6
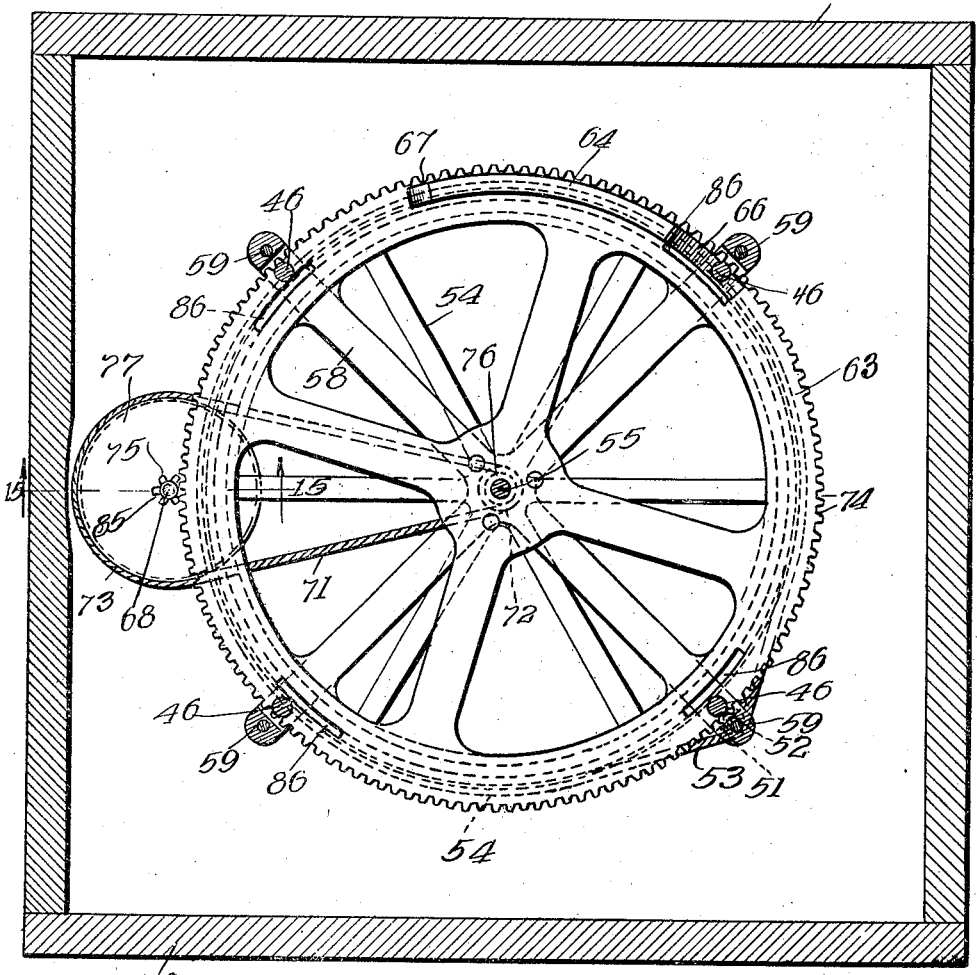
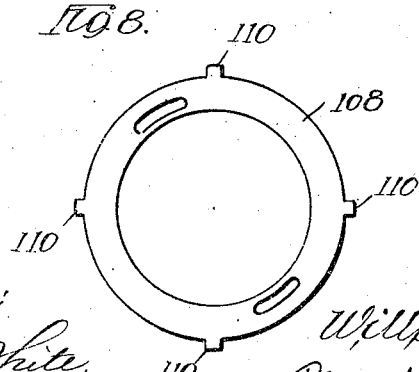

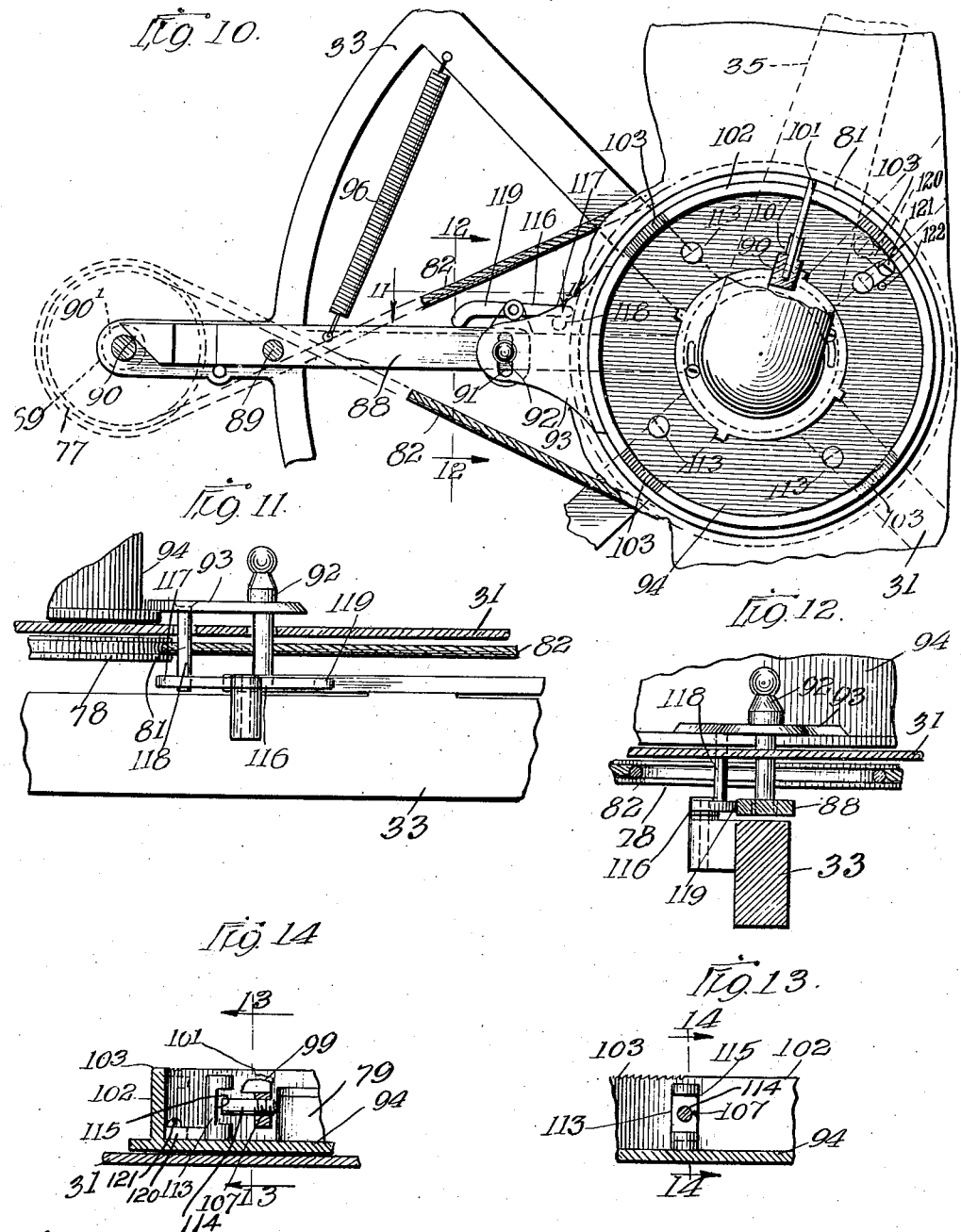

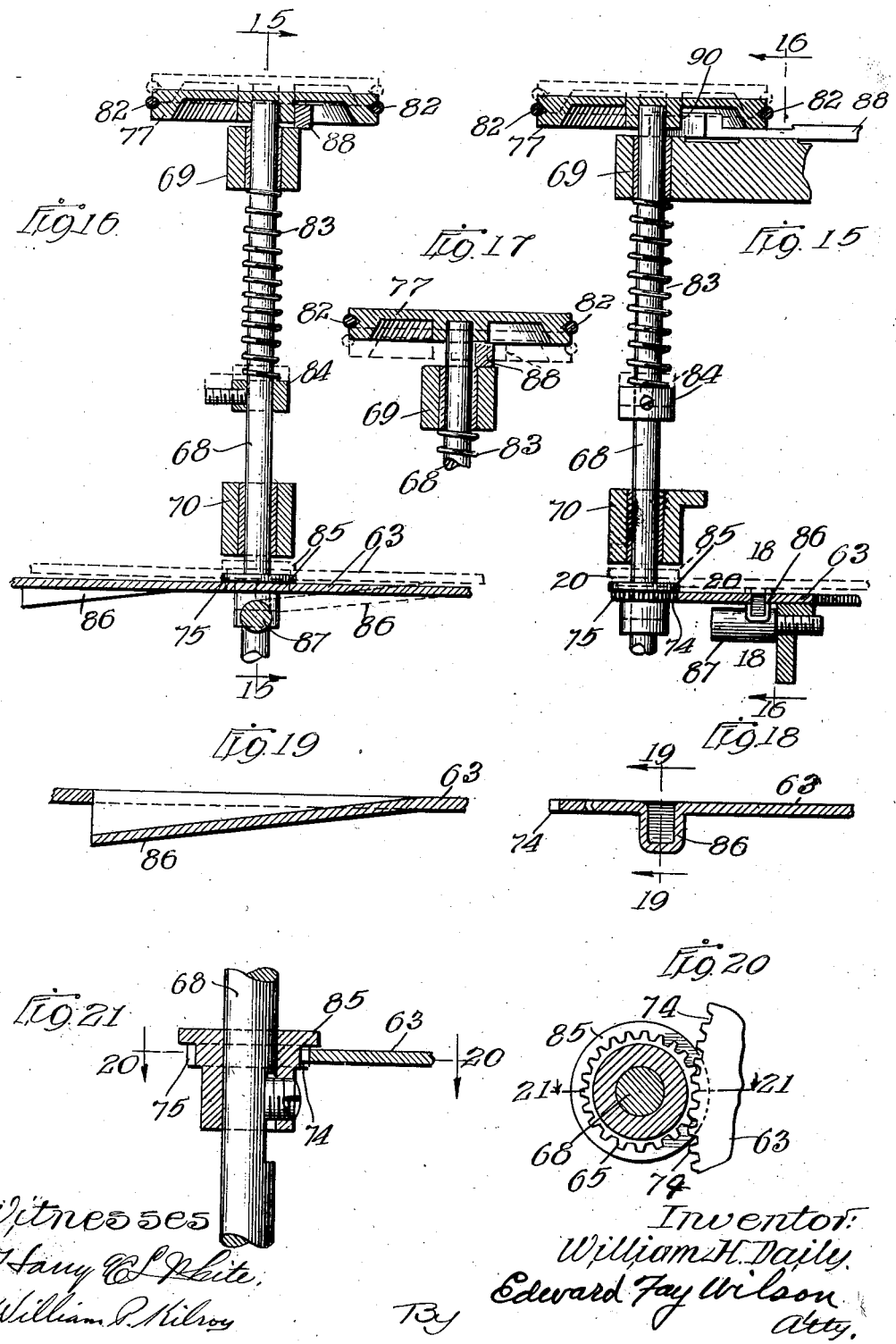

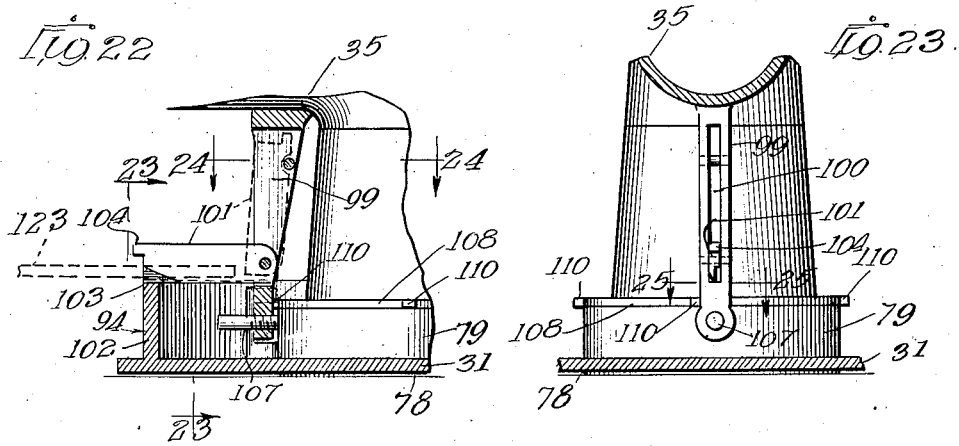

Patented Oct. 25, 1932

1,885,005

UNITED STATES PATENT OFFICE

WILLIAM H. DAILY, OF CHICAGO, ILLINOIS

AUTOMATIC PHONOGRAPH

Application filed August 13, 1926. Serial No. 128,987.

My invention relates to improvements in phonographs and has special reference to multiple disk machines, and improved means for automatically starting and stopping the operation of the several records in succession.

This present invention is an improvement upon my earlier inventions, as shown in United States Patents Nos. 1,168,606, 1,466,791 and 1,599,876.

An object of this invention is to provide a machine of the character described which shall be quiet in its operation, which shall consist of a minimum number of parts, and which can be manufactured at a relatively small cost.

It is one of my objects to provide a machine of the character mentioned which shall be automatically controlled by the records themselves and so that upon the completion of one record, regardless of its length, the machine will operate to substantially immediately begin the playing of the next successive record. In other words, the automatic setting of the tone arm with its reproducing needle and the starting and stopping of the successive disks is controlled by the records themselves and the machine requires no manual control or adjustment for playing specific records successively and with equal or uniform minimum intervals of time between the finishing of one record and the starting of the next record.

A particularly advantageous feature of my invention resides in the unique and simple means which I have provided for automatically controlling the successive rotation of the several turn-tables which carry the disk records, and also in the simple and effective means which I employ for stopping the rotation of any given disk as soon as it has been completely played and starting the next successive record.

There are two kinds of records in common use, one provided with an eccentric needle groove at the center of the disk into which the needle of the sound reproducing device is guided after it has passed through the operating groove, and the other with a concentric groove at the center of the disk and a spiral groove through which the needle travels to the concentric groove after passing through the operating groove.

It is one of the objects of my present invention to provide a machine upon which record disks of either kind above described can be played promiscuously, the machine operating automatically to play the successive disks upon the completion of the playing of the preceding disks.

One feature of my present invention is the simple means I have provided for automatically swinging the tone arm around from one position or disk to the next and for stopping or setting the arm in position to start upon the next successive disk.

A further feature relates to very simple means of rendering the automatic shifting mechanism ineffective when it is desired to repeat the playing of any specific record.

In the embodiment of my invention illustrated by the accompanying drawings I have shown four disk supporting turn-tables arranged in a circle and a tone arm mounted centrally of the circle of turn-tables and adapted to be swung around from one to another to successively cooperate with disks carried by the tables. While I have shown but four of the turn-tables, it should be clear that my invention is not thus limited.

Further features and advantages of my invention will be made clear from the following description taken in conjunction with the accompanying drawings, forming part of this specification and in which:—

Fig. 3 is a vertical, central section on the line 3—3 of Fig. 1;

Fig. 4 is a vertical, central section on the line 4—4 of Fig. 1;

Fig. 5 is a fragmentary, horizontal section on the line 5—5 of Fig. 3;

Fig. 6 is a horizontal section on the line 6—6 of Fig. 2;

Fig. 7 is a horizontal section on the line 7—7 of Fig. 2;

Fig. 8 is a detail plan view of a stop ring;

Fig. 10 is a fragmentary, horizontal section on the line 10—10 of Fig. 3, particularly illustrating the control means;

Fig. 11 is a fragmentary, vertical section on the line 11—11 of Fig. 10;

Fig. 12 is a fragmentary, vertical section on the line 12—12 of Fig. 10;

Fig. 13 is a fragmentary, vertical section on the line 13—13 of Fig. 4;

Fig. 14 is a vertical section on the line 14—14 of Fig. 13;

Fig. 15 is a fragmentary, vertical section on the line 15—15 of Figs. 7 and 16;

Fig. 16 is a fragmentary, vertical section on the line 16—16 of Fig. 15;

Fig. 17 is a section similar to Fig. 16, but showing the auxiliary drive shaft held in upper position;

Fig. 18 is a fragmentary, vertical section on the line 18—18 of Fig. 16;

Fig. 19 is a fragmentary, vertical section on the line 19—19 of Fig. 18;

Fig. 20 is a fragmentary, horizontal section on the line 20—20 of Figs. 15 and 21;

Fig. 21 is a fragmentary, vertical section on the line 21—21 of Fig. 20;

Fig. 22 is a fragmentary, vertical section on the line 22—22 of Fig. 1;

Fig. 23 is a fragmentary, vertical section on the line 23—23 of Fig. 22;

Fig. 24 is a fragmentary, horizontal section on the line 24—24 of Fig. 22;

Fig. 25 is a fragmentary, horizontal section on the line 25—25 of Fig. 23; and

Fig. 26 is a fragmentary elevation showing an end view of one of the operating pawls.

Figure 1:
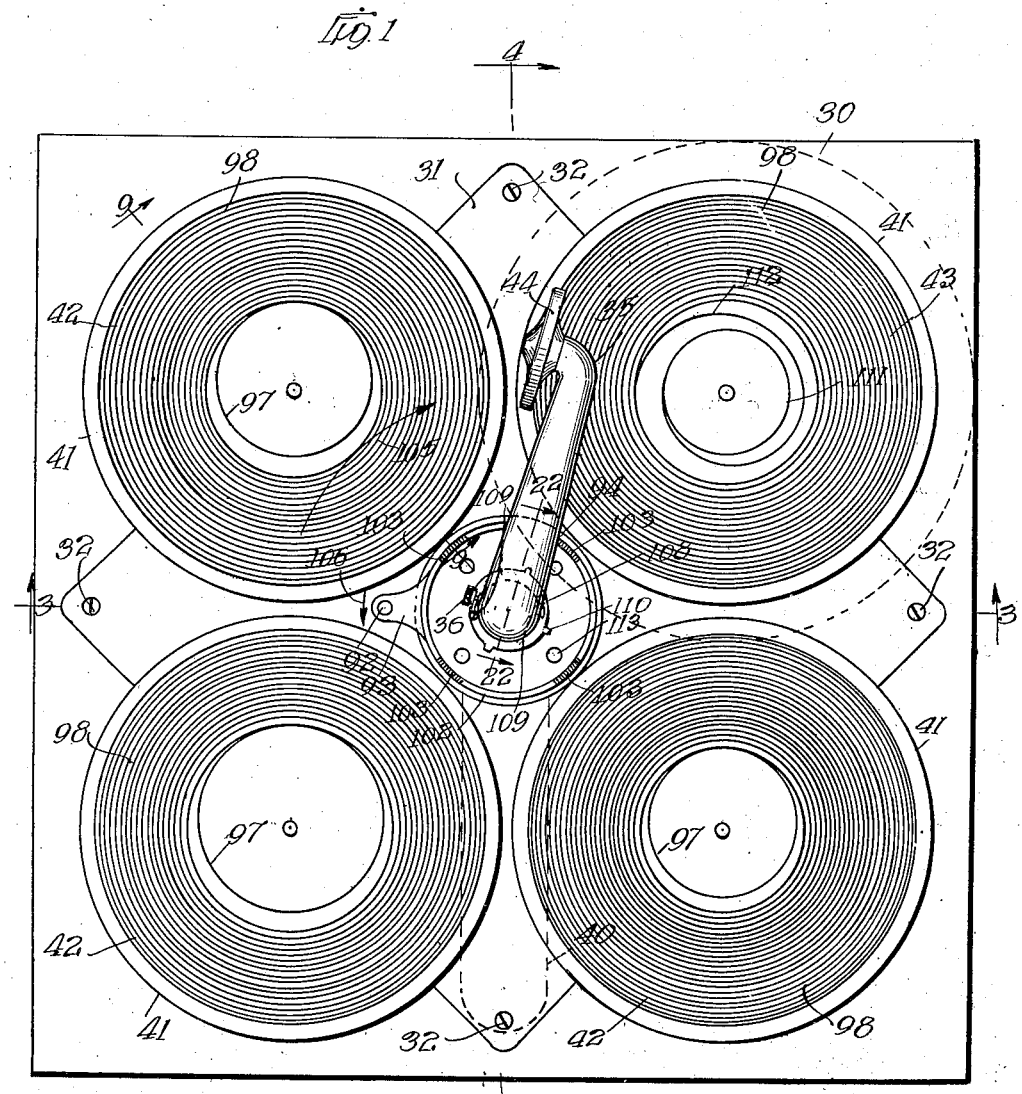
Fig. 1 is a top plan view showing a device for four records.
Figure 2:
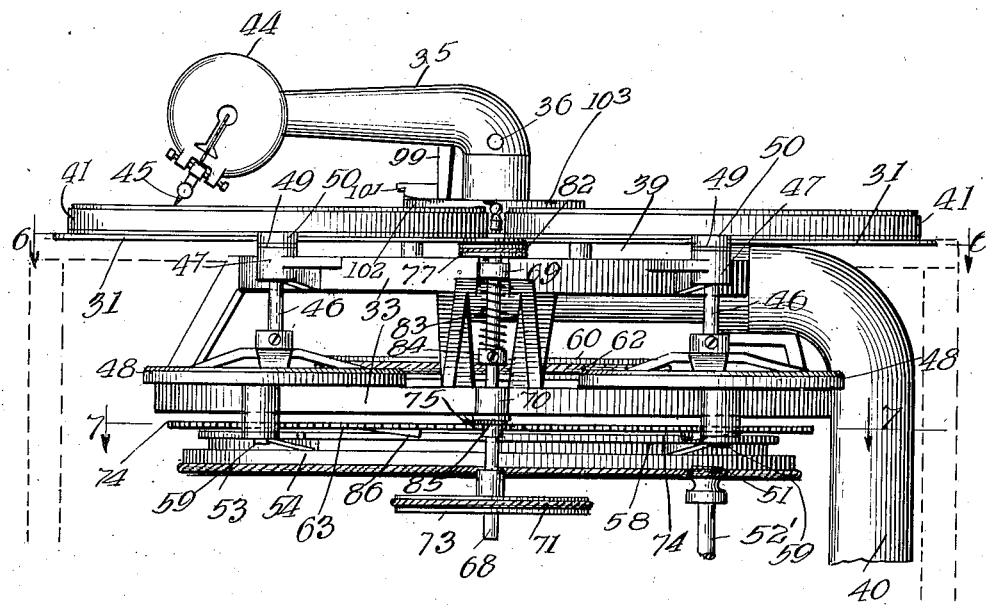
Fig. 2 is a side elevation of the device as seen from the left on Fig. 1.

In said drawings 30 represents a casing or support for the mechanism and may represent the supporting platform in a suitable cabinet.

The operating mechanism, except the usual driving motor, is secured to a thin metal plate 31 which is secured upon the platform 30 by screws 32.

The turn-tables for the records and the tone arm and some of the control mechanism are located above the plate 31, but the major part of the operating mechanism is located below and depends from the plate 31. Below and supported by the plate 31 is a main frame 33 upon which the various operating parts are mounted. This frame is held up to the plate by a plurality of screws 34.

A tone arm 35 is mounted centrally of the plate 31 and is adapted to swing around through a complete circle. The tone arm is pivotally mounted at its inner end on a horizontal pivot pin 36 to swing up and down to a slight degree. The pin 36 is carried in the upper end of a bearing member 37 which in turn is mounted in a rigid bracket 38 to swing around horizontally. The bracket 38 is carried in the upper end of a tone tube 39 which extends down through the plate 30, then horizontally to one side where it is adapted to be connected to a suitable horn by an elbow 40. The tone tube 39 preferably forms part of the frame 33.

Surrounding the mounting of the tone arm in the form of device shown in the drawings are four turn-tables 41 arranged in a circle concentric with the mounting of the tone arm and adapted to support the usual flat records 42, 43, provided with suitable tone reproducing stylus grooves. The tone arm carries on its outer end a suitable tone reproducing device 44, including a suitable stylus or needle 45.

Figure 9:
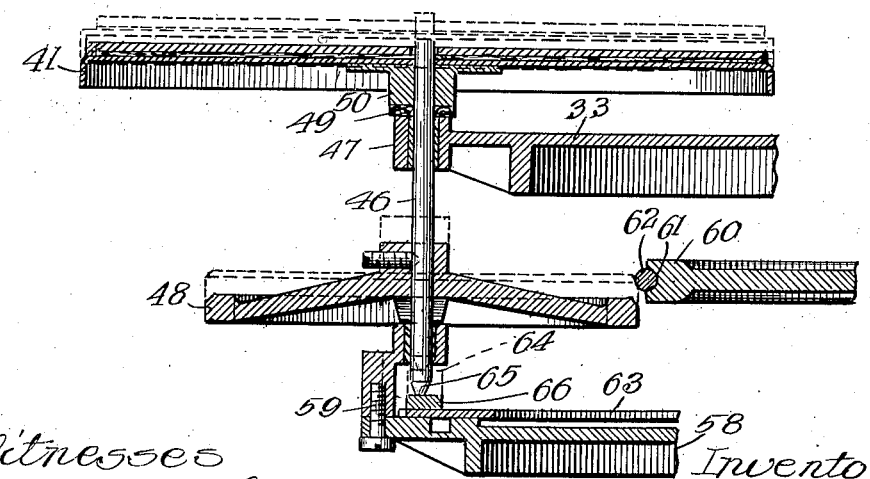
Fig. 9 is a vertical section taken centrally of one of the turn-tables on the line 9—9 of Fig. 1.

The turn-tables are each secured to a vertically mounted shaft or spindle 46 and each spindle is rotatably carried in a vertical bearing 47 formed on the frame 33. The spindle in each case extends down through its bearing and carries below the bearing a smooth faced drive pulley 48. Each spindle with its turn-table and drive pulley is movable up and down through its bearing 47. For the sake of quiet operation felt washers 49 (Fig. 9) are interposed between the top of the bearing 47 and the bottom of the hub 50 of the turn-table and upon which the turn-table rests at the lower limit of its vertical movement.

The turn-tables are adapted to be lifted in succession from their lower positions where they are inoperative to upper or raised positions when it is desired to play a record supported thereby.

The mechanism for lifting the turn-tables will now be described.

While any suitable source of power may be used, I prefer to drive the mechanism by a motor, preferably an electric motor, which I have indicated merely by a small drive pulley 52 which is carried by a vertical shaft 52′ and is grooved to receive a round drive belt 53. To drive the mechanism by the belt 53 and especially to greatly reduce the speed there is provided a large diameter drive wheel 54 provided with a groove to receive the belt 53. The drive wheel is mounted on a vertical axis to rotate horizontally. It is rigidly mounted on the lower end of a central vertical shaft which is rotatably mounted in an upper bearing 56 and a lower bearing 57 provided on a lower spider-like part 58 of the frame 33. This spider is secured to the frame 33 proper by screws 59. Secured upon the shaft 55 between the bearings 56 and 57 is a drive wheel 60 provided with a groove 61 in which a friction member in the form of a round belt 62 is placed. This friction member 62 is preferably yielding and elastic and is sprung into the groove and held therein by its own contraction.

The drive wheels 48 of the turn-tables 41 are adapted to have their peripheries brought into driving contact with the friction member 62 and be driven thereby, the spacing of the spindles from the shaft 55 and the relative diameters of the drive wheel 60 and the wheels 48 being such that when the turn-tables are lifted the pulleys 48 properly contact with the friction drive belt 62. The vertical location of the pulley 60 is fixed and the pulleys 48 when raised contact with same and when lowered they are freed of contact and stop rotating.

For lifting the several spindles 46 in succession there is provided a horizontal wheel 63 mounted concentrically with the center shaft 55, in other words, concentric with the circle in which the turn-tables are mounted. This wheel which is adapted to be rotated about the central vertical axis carries a cam bar 64. This cam bar 64 is arcuate in top plan view, as best shown in Fig. 6, and is so arranged or set on the wheel 63 that as the wheel 63 is rotated the cam bar passes beneath the lower ends 65 of the turn-table spindles 46. The forward end 66 of the cam bar 64 is inclined upwardly so that it can slide easily beneath the lower ends of the spindles and lift the spindles. Their lower ends are made bluntly conical and are preferably hardened to prevent wear by the cam 64. The main length of the cam bar 64 is flat on top so that after a spindle has been lifted it will be maintained at its upper position until allowed to drop down again by the further rotation of the cam wheel 63; the rear end 67 is inclined downwardly at an angle of approximately forty-five degrees for the purpose of letting the spindles down easily. The wheel 63 is intermittently driven for the reason that it is desired to lower the turn-tables as soon as a record has been played regardless of its length. The machine is designed to play automatically records of the same size, preferably 10" records, though a larger record can be played if desired. Such records vary in their lengths of grooves and the machine is designed to drop the turn-table immediately a record has been completely played. For this purpose the cam bar 64 is moved forward until the spindle stands near the rear end of the bar ready to be dropped upon the further movement of the bar or the wheel 63.

To accomplish this intermittent and controlled movement of the cam wheel 63 there is provided a vertical auxiliary shaft 68 rotatably carried in an upper bearing 69 and a lower bearing 70 on the frame 33. This shaft is driven by a belt 71 trained around a small pulley 72 formed rigid with the large drive pulley and around a relatively larger pulley 73 mounted in the lower end of the shaft 68 to rotate therewith. The cam wheel 63 has gear teeth 74 formed on its periphery and the shaft 68 carries a small pinion 75 having teeth adapted to mesh therewith and whereby the cam wheel is driven when these two are in mesh. As the lengths of the operating stylus grooves in the various records vary as to length, means are provided adapted to be controlled by the stylus grooves for causing the pinion 75 to engage the teeth of the cam wheel 63 and start it rotating as soon as the record is completely played. It is to be noted that the cam 64 is of such a length that when it has moved to a point where it is about ready to drop the lifted turn-table its forward lifting end is located but a short distance from the next spindle in succession. This cam wheel is secured to a hub 76 which is mounted for rotation on the central shaft 55.

Upon the upper end of the vertical shaft 68 is fixed a small belt pulley 77. This pulley is located just beneath the plate 31. Upon the hub portion of the central upstanding part of the tone tube 39 there is a circular plate 78 mounted for horizontal rotation; this plate has a central hollow hub 79 surrounding the tone tube 39 and rotatable thereon. This rotatable member rests upon a horizontal flange 80 on the tone tube. The circular member 78 is provided with a belt groove 81 in its periphery adapted to receive a belt 82 which is driven by the belt pulley 77 on the shaft 68. The function of the rotatable member 78, 79 will be described later.

The belt pulley 77 and the pinion 75 are both fixed on the shaft 68 and the shaft 68 is vertically movable in its bearings. At the upper limit of its movement the pinion is adapted to be out of mesh with the teeth of the cam wheel 63 and at the lower limit of its movement to be in mesh with same. A spring 83 is provided surrounding the shaft 68 and interposed between the upper bearing 69 and a collar 84 fixed to the shaft which tends to force the shaft 68 to the lower limit of its movement.

When the cam wheel 63 is being rotated the shaft is at the lower limit of its movement and the pinion 75 is in mesh with the teeth on the cam wheel 63. For the purpose of lifting the shaft 68 the pinion is provided with a top flange 85 just above the teeth of the pinion, one large enough in diameter to be engaged by the cam wheel 63 when the same is raised. The cam wheel is made of sheet material and, being quite large in diameter, can be readily lifted at its edge sufficient to lift the shaft 68 the slight amount necessary to disengage the teeth of the pinion from the teeth 74 of the cam wheel. For this lifting of the edge of the cam wheel there is provided wedge shaped cam parts 86 on the under side of the cam wheel. There are four of these cam parts spaced equally around the cam wheel, one for each turn-table. These wedge shaped cam parts 86 are adapted to contact with a fixed projection 87 which projects from the frame 33 adjacent to the shaft 68. These wedge shaped cams ride over the projection 87 and spring the cam wheel 63 upward, thus lifting the shaft 68, and this action occurs just as the spindle lifting cam is nearing its rear end. To disengage the pinion from the teeth 74 means are provided for holding or latching the shaft 68 in its lifted position and then when the cam wheel 63 drops upon the passing of the lifting wedge shaped cam past the projection 87 the pinion remains up and is disengaged.

The latch means consists of a horizontal lever 88 pivoted between its end at 89 on the top of the frame 33 and beneath the plate 31. The outer end 90 of the lever 88 is adapted to be projected inwardly between the hub 90' of the belt wheel 77 and the top of the bearing 69 when the shaft has been lifted and thus prevent the shaft from dropping back. The inner end of the lever 88 projects in toward the center of the machine and is provided adjacent to its inner end with a transverse slot or opening 91 adapted to receive a downwardly projecting pin 92. This pin is carried by an arm 93 rigid with and projecting out from a shallow cup shaped central member 94 mounted to rotate freely around the central hub 79. To mount the cup 94 for easy rotation a series of small antifriction balls 95 are arranged beneath the cup in depressions provided in the plate 30. It will now be understood that the lever 88 can be moved by the cup shaped member to unlatch the shaft 68 and start the cam wheel 63 to rotating. A pull spring 96 is attached at one end to the lever 88 within the pivot and at its other end to the frame 33 and tends to hold the lever 88 with its outer end pressed in a direction to enter beneath the hub of the wheel 77 as soon as the same is lifted.

To cause the cup shaped member 94 to rotate and thereby move the lever through the medium of the projection 92 I make use of a groove in the record which is adapted when the playing of the record is completed to cause the tone arm to swing back and forth. Such a groove is indicated at 97 on several of the records and is in the form of an eccentric circle at the middle portion of the record within the sound producing portion 98 of the stylus groove and into which the stylus is guided from the sound groove. This eccentric groove tends to swing the tone arm back and forth a slight amount and I make use of this oscillating movement of the tone arm to release the shaft 68 and through the cam wheel 63 stop the rotation of the record which has just been finished and start the next turntable in succession. To cause this operation there is provided an arm or projection 99 rigid with the tone arm and projecting downwardly from the horizontal part of the tone arm into the cup 94. As best shown in Figs. 22 to 26 inclusive, this projection is provided with a longitudinal elongated slot 100 and a pawl 101 is pivotally mounted at one end adjacent to the lower end of the slot 100 and is adapted to be dropped down to horizontal position, as shown in Fig. 22, or to be raised to vertical inoperative position, as indicated in dotted lines, Fig. 22. This pawl is long enough to reach out to the wall 102. As shown in Figs. 1, 10 and 24, the upper edge of the cup wall 102 is provided with four sets or series of ratchet teeth 103 adapted to be engaged by the outer end 104 of the pawl. The tone arm is adapted during the playing of a record and when it moves from one record to the next to swing forward in the direction of the arrow 105, Fig. 1. When the stylus enters the eccentric groove 97 the tone arm swings back and forth. The teeth 103 on the edge of the cup 94 are ratchet shaped and are so inclined and the contacting edge of the pawl 101 is so relatively inclined that the tone arm is free to swing forward without operative engagement of the pawl with the cup, but upon a rearward swing or movement of the tone arm the pawl engages with one of the teeth 103 on the cup and swings the cup with it. This movement of the cup 94 is in the direction of the small arrow 106, Fig. 1. These several series of ratchet teeth 103 are so arranged on the edge of the cup that the pawl 101 is ready to engage same when the stylus enters the eccentric circle 97, whether the same is large or small. The eccentricity of the circle 97, which measures the oscillation of the tone arm, is sufficient to cause the cup to swing backward at least the distance of one tooth and is preferably sufficient to cause a greater movement of the cup for each backward swing of the tone arm. The tone arm continues to swing back and forth until the cup 94 has been rotated backwards sufficient to cause the projection 92 to engage the inner end of the lever 88 and swing the lever to release the shaft 68, as has been described. When this occurs the cam wheel 63 is started to rotate and the cam 64 is moved forward, dropping down the turn-table which has been rotating and moving forward until the shaft 68 is again lifted by the next succeeding wedge cam 86. After one turn-table has dropped down and before the next successive turn-table is lifted it is necessary to swing the tone arm around so as to be ready to engage the next record.

To effect this forward shifting of the tone arm an adjustable friction contact member 107 is provided at the lower end of the rigid projection 99. This member has a screw thread engagement with the arm 99 and its inner end is adapted to rest against the cylindrical outer surface of the hub 79 which is constantly rotated in a forward direction from the shaft 68 by the belt 82 which is a crossed belt in order to rotate the hub in the right direction. The contact member 107 is adjusted to contact with the hub when the tone arm is not supported by a record and, as explained before, the tone arm is pivotally mounted so that it can swing up and down a slight amount. The arrangement is such that as the turn-table carrying the record which has just been completed is lowered following the release of the shaft 68, the tone arm follows down until it is sustained by the contact of the friction member 107 with the hub 79. This contact is sufficient to cause the tone arm to swing forward in the direction of the arrow 105 until it is stopped. To stop the tone arm and set it accurately above the next record to be played there is provided ring plate 108 secured to the fixed base 39 of the tone tube by screws 109. This plate is provided with four stop projections 110 which project out into the path of the lower end of the projection 99 when the tone arm is in its lower position. The stops 110 are arranged to stop the tone arm as it swings forward in position so that as the turn-table is raised with its record the stylus will be in position to start in the operating groove. Preferably the stylus is set so that as the record is lifted up the stylus contacts with the record just outside of the sound groove, but as the record is already being rotated at this time and as the tone arm is long enough so that the drag of the record on the stylus is inwardly, the stylus is dragged inwardly across the record into the sound groove. As the turn-table rises beneath the tone arm and contacts with the stylus the tone arm is swung upwardly sufficient to carry the arm 99 outwardly, free of the stop projection 110, and the arm is free to swing forward to follow the sound groove of the record being played.

Some records, as for instance the one shown at 43, Fig. 1, have a concentric stylus groove 111 at the center of the record instead of the eccentric groove 97 heretofore described. The concentric groove 111 is connected with the operating groove of the record by a spiral groove 112 and when the stylus has passed through the operating groove of such a record it is swung inwardly through the spiral groove 112 into the concentric groove 111. This forward movement of the stylus and tone arm, in playing such a record, is made use of to cause the shifting of the lever 88 to control the successive movements of the turn-tables and tone arm. For this purpose there are provided four pins or stops 113 upstanding in the cup 99. These stops 113 are arranged to cooperate with the outer end 114 of the friction member 107. These stops are arranged in the path of the outer end 114 of the member 101 but are notched on their inner sides, as shown at 115, so that when the tone arm is down and the member 107 is in contact with the hub the tone arm can move forward. When, however, the tone arm is raised, as when a record is being played, the outer end 114 of the member 107 contacts with the stop 113 above the notch 115. The arrangement is such that this engagement occurs as the stylus approaches the concentric circle 111 through the spiral groove 112 and while the tone arm is being swung forward. This contact swings the cup 94 forward, that is, in a direction opposite to that in which it is swung by the pawl 101.

To effect the release of the shaft 68 by this forward movement of the cup instead of the rearward movement, as before explained, there is provided a lever 116 pivoted to the frame of the machine adjacent to the inner end of the lever 88. The lever 116 is pivoted between its ends and its inner end 117 projects inwardly into the path of a projection 118 rigid with the cup 94. The opposite end 119 of the lever 116 engages against the adjacent side of the inner end of the lever 88. As the cup 94 is moved forward by the contact of the member 107 with one of the projections 113 the inner end 117 of the lever 116 is swung forward and the rear end backward. This movement of the lever 116 throws the read end of the lever 88 rearward sufficient to cause the release of the shaft 68. The opening 91 at the inner end of the lever 88 is elongated to permit the cup 94 to move freely forward in response to the movement of the stylus through the spiral groove 112.

It will now be clear that whether a record is used which has an eccentric groove or a concentric groove at the center the machine operates automatically to play one record after another and it should be understood that either style of record can be placed on any turn-table and the machine will properly continuously operate.

Sometimes it is desired to repeat the same record several times instead of successively playing different records. For this purpose the pawl can be swung up to vertical position, as shown in dotted lines, Fig. 22, and it is so arranged that it remains in such vertical position. In this position it is of course inoperative to effect the automatic operation of the machine. Furthermore, one of the projections 113, as shown in Figs. 13 and 14, is arranged to be swung outwardly from its operative position to an inoperative position. For this purpose this projection is mounted on a small plate 120, see Fig. 16, which is secured on the bottom of the cup 94 by a screw 121. The screw does not bind the plate tight but permits it to be swung around to the dotted position to carry the projection 113 out of the path of the member 107. A stop 122—see Fig. 10—is provided to retain the projection 113 in operative position when swung inwardly.

When it is desired to repeat a record instead of having the machine operate to automatically play successive records, it is merely necessary to lift the pawl 101 and to swing the movable projection 113 outwardly and to place the record on the turn-table adjacent to the movable projection 113.

Sometimes it is desired to play a record which is larger in diameter than that for which the machine is designed to play. For this purpose the pawl 101 and the movable stop 113 are moved to inoperative positions and then a larger record can be placed upon the turn-table adjacent to the movable stop 113.

A larger record 123 is indicated by the dotted lines on Figs. 1, 4 and 22 where the inner edge of the record is shown as projecting over the cup 94 and into close relation to the lifted pawl 101.

As many modifications of my invention will readily suggest themselves to one skilled in the art, I do not limit or confine my invention to the specific mechanisms and constructions herein shown and described.

I claim:

1. In an automatic phonograph, a plurality of record holding turn tables arranged in a circle, a stylus carrying tone arm mounted to swing in a circle over the turn tables, the records having stylus run-over grooves extending within the operating groove and adapted to swing the arm back and forth after the record has been played, means operable to swing the tone arm from one record to another upon the completion of playing a record, and means operable by the backward swinging of the tone arm, due to the run-over grooves, adapted to initiate the forward swinging action of the arm swinging means.

2. In a multi-disk phonograph, a plurality of turn-table supports arranged in a circle, a tone arm rotatably mounted concentric with said circle and carrying a stylus for engagement with a phonograph record, a spindle for each turn-table, the turn-tables being adapted to be successively lifted from a common inoperative plane to an operating position, a rotatable member arranged concentric with the turn-tables and having an arcuate cam adapted to successively engage said spindles and successively raise the turn-tables, driving means for said rotatable member, means normally holding said driving means out of engagement with the rotatable member, and an operative connection between said holding means and the tone arm whereby when the tone arm is swung either forward or backward after the completion of playing a record it will release said holding means.

3. In a phonograph, a plurality of rotatable disk supports arranged in a circle, each support carried on a vertically movable spindle, a rotatable member provided with a cam part adapted to successively lift the spindles, a rotating driver adapted to be depressed to engage said member, latch means for engaging said driver when lifted to hold same in lifted position, a lifting cam on the rotatable member adapted to lift the driver to inoperative position, a tone arm rotatably mounted at the center of said circle, and means operable by the swinging of the tone arm after passing through a record groove for withdrawing said latch.

4. In a phonograph, a plurality of rotatable disk supports arranged in a circle, each support carried on a vertically movable spindle, a rotatable member provided with a cam part adapted to successively lift the spindles, a rotating driver adapted to be depressed to engage said member, latch means for engaging said driver when lifted to hold same in lifted position, said rotatable member being capable of being lifted and provided with lifting cams, one for each disk support, and a cam abutment adjacent to the rotating driver arranged to lift the rotatable member at a predetermined point in relation to the spindle lifting cam, the driver being provided with a flange adapted to be engaged by the rotatable member to lift the rotatable member and permit said latch to operate to hold said driver lifted, the rotatable member being adapted to return to its normal lower position upon the release of the lifting cam from said abutment.

5. In a phonograph, a plurality of disk supports arranged in a circle, a common operator for said supports, means for successively engaging and disengaging the supports with the operator for rotation thereby, a tone arm mounted concentric with said supports, a control member concentrically surrounding the base of the arm, a control operating lever carried by the arm, ratchet teeth on the control member adapted to be engaged by said lever when the arm is moved in a rearward direction to stop the rotation of one disk support and start the rotation of the next successive support.

6. In a phonograph, a plurality of disk supports arranged in a circle, a driving wheel arranged concentric with the disks and adapted to be constantly driven by a power belt, each support being carried by a vertically movable spindle, a rotatable member concentric with said driving wheel and provided with a cam member for successively lifting said spindles, a secondary shaft parallel with the axis of said driving wheel and belt driven therefrom at a reduced speed, said secondary shaft being vertically movable and adapted to be rotatably engaged with said rotatable member and adapted to drive same at a relatively slow speed, a tone arm propeller member concentric with said driving wheel and rotatably independently thereof and a belt operatively connecting said secondary shaft and said arm propeller and arranged to drive same in a reverse direction to the direction of rotation of said rotatable member.

7. In a phonograph having a plurality of rotatable supports arranged in a circle, a vertically movable spindle for each support, means for successively lifting the supports from an inoperative to an operative position, a support propeller arranged concentric with the several supports, means for constantly driving said propeller, each spindle carrying a driving wheel, said propeller having a groove in its periphery and a yielding friction member in said groove having a rounded outer surface, each driving wheel having a periphery adapted to be brought into contact with said rounded surface on the propeller, the initial contacting edge on each driving wheel being beveled and the remaining part straight whereby such driving contact does not limit the vertical positioning of the driving wheel.

8. In a phonograph, a plurality of turn-table supports arranged in a circle, each secured to a vertically movable spindle, a rotatable spindle lifter provided with an arcuate lifting cam rail adapted to engage beneath the spindles successively, means adapted to be controlled by a disk record on one of the turn-tables to cause the rotation of the spindle lifter to project the cam rail beneath the next successive spindle, and means for stopping the rotation of the spindle lifter at a predetermined point.

9. In an automatic phonograph having a plurality of record turn-tables arranged in a circle, a stylus carrying arm mounted concentrically with the circle of turn-tables and means for swinging the arm from turn-table to turn-table to successively play disk records carried by the tables, the combination with disk records for use on the tables, the disk records having groove extensions at their centers into which the stylus is carried upon the completion of the records, such groove extensions being either of the eccentric or spiral-lead-in type of means co-operating with the base of the arm adapted to initiate the automatic action of the phonograph, by the movement of the arm due to said extension of the groove at the center of the record to cause the playing of the next successive record by the forward movement of the arm due to a spiral-lead-in extension groove and also by the backward movement of the arm due to an eccentric extension groove.

10. In an automatic phonograph having a plurality of record turn-tables arranged in a circle, a stylus carrying arm mounted concentrically with the circle of turn-tables and means for swinging the arm from turn-table to turn-table to successively play disk records carried by the tables, the combination with disk records for use on the tables, the disks records having groove extensions at their centers into which the stylus is carried upon the completion of the records, such groove extensions being of the eccentric type and adapted to swing the arm back and forth through a relatively slight angle, of means arranged at the base of the arm operable by the backward swinging of the arm to initiate the automatic action of the phonograph to cause the playing of the next successive record.

11. In a phonograph, a turn-table for supporting a grooved record disk, a stylus carrying arm mounted to swing in a horizontal circle and adapted to position the stylus above the turn-table for co-operation with a grooved record carried thereby, means for swinging the arm around in a horizontal circle when free of a record, automatic means for lifting the turn-table from a lower inoperative position to an upper position for operatively contacting the stylus with a grooved record carried by the turn-table, the disks used having extension grooves at their centers of either the eccentric or spiral-lead-in type, whereby the arm is swung either forward only or forward and back after the completion of playing a record, and means at the base of the arm adapted to initiate the automatic lowering of the turn-table for separating the record and stylus upon the completion of playing a record either by the forward swinging of the arm due to a spiral-lead-in groove or by the backward swinging of the arm due to an eccentric extension groove.

12. In a phonograph, a turn-table for supporting a grooved record disk, a stylus carrying arm mounted to swing in a horizontal circle and adapted to position the stylus above the turn-table for co-operation with a grooved record carried thereby, means for swinging the arm around in a horizontal circle when free of a record, automatic means for lifting the turn-table from a lower inoperative position to an upper position for operatively contacting the stylus with a grooved record carried by the turn-table, the disks used having extension grooves at their centers of the eccentric type whereby the arm is swung back and forth through a slight angle upon the completion of playing a record, and means at the base of the arm adapted to initiate the automatic lowering of the turn-table to separate the record and stylus, by the movement of the arm due to the eccentric extension groove.

13. In an automatic phonograph, a turn-table for carrying a grooved disk record, a stylus carrying arm mounted to swing horizontally and to be positioned above the record for co-operation therewith, automatic means for separating the disk and arm at the completion of a record, automatic means for swinging the arm horizontally after the completion of a record, the records having extension grooves at their centers of either the spiral-lead-in or the eccentric type, whereby the arm is either swung forward or forward and back after the completion of a record, and means co-operating with the base of the arm for initiating the automatic separation of the disk and arm, and the swinging of the arm by either the forward swinging of the arm due to a spiral-lead-in extension or by the backward swinging of the arm to an eccentric extension.

14. In an automatic phonograph, a turntable for carrying a grooved disk record, an arm mounted to swing horizontally and to be positioned above the record for co-operation therewith, a stylus carried by the arm arranged and adapted to be actuated by a grooved record, automatic means for lowering the disk away from the stylus at the completion of a record, automatic means for swinging the arm horizontally after the disk is lowered, the records having extension grooves at their centers of the eccentric type whereby the arm is swung back and forth through a slight angle after the completion of a record, and means arranged and adapted to be actuated by the swinging of the arm beyond the range of the usual sound groove for initiating the automatic separation of the disk and arm and the swinging of the arm.

15. A phonograph adapted to play grooved disk records having run-over grooves of either the spiral-lead-in type or the eccentric type, a swinging arm, a groove following stylus carried by the arm and by which the arm is swung, means for causing the phonograph to continue its operation after the completion of the playing of a record, automatic means for controlling the action of said operation continuing means, and means for initiating the action of the automatic control means arranged and adapted to be operated by the arm when it is swung inwardly to a predetermined inward position by a spiral-lead-in groove on a record being played, and also arranged and adapted to be operated by the arm when it is swung backward due to a run-over groove of the eccentric type on a record being played.

16. A phonograph adapted to play grooved disk records having run-over grooves of either the spiral-lead-in type or the eccentric type, a swinging arm, a groove following stylus carried by the arm and by which the arm is swung, automatic means for stopping the operation of the phonograph, and means for initiating the action of the automatic stopping means arranged and adapted to be operated by the arm when it is swung inwardly to a predetermined inward position by a spiral-lead-in groove on a record being played, and also arranged and adapted to be operated by the arm when it is swung backward due to a run-over groove of the eccentric type on a record being played.

17. A phonograph adapted to play grooved disk records having run-over grooves of either the spiral-lead-in type or the eccentric type, a swinging arm, a groove following stylus carried by the arm and by which the arm is swung, automatic means for returning the arm to the beginning of the record after the playing of same, and means for initiating the action of the automatic returning means arranged and adapted to be operated by the arm when it is swung inwardly to a predetermined inward position by a spiral-lead-in groove on a record being played, and also arranged and adapted to be operated by the arm when it is swung backward due to a run-over groove of the eccentric type on a record being played.

18. A phonograph adapted to play grooved disk records having run-over grooves of either the spiral-lead-in type or the eccentric type, a swinging arm, a groove following stylus carried by the arm and by which the arm is swung, automatic means arranged and adapted for separating the stylus from the record upon the completion of playing the record, and means for initiating the action of the automatic separating means arranged and adapted to be operated by the arm when it is swung inwardly to a predetermined inward position by a spiral-lead-in groove on a record being played, and also arranged and adapted to be operated by the arm when it is swung backward due to a run-over groove of the eccentric type on a record being played.

19. A phonograph adapted to play grooved disk records having run-over grooves of either the spiral-lead-in type or the eccentric type, a swinging arm, a groove following stylus carried by the arm and by which the arm is swung, automatic means arranged and adapted for separating the stylus from the record, swinging the arm to its beginning position, and causing the stylus to contact again with the record upon the completion of playing a record, and means for initiating the action of the automatic means arranged and adapted to be operated by the arm when it is swung inwardly to a predetermined inward position by a spiral-lead-in groove on a record being played, and also arranged and adapted to be operated by the arm when it is swung backward due to a run-over groove of the eccentric type on a record being played.

20. A phonograph adapted to play grooved disk records having run-over grooves of either the spiral-lead-in type or the eccentric type, a swinging arm, a groove following stylus carried by the arm and by which the arm is swung, automatic means arranged and adapted for separating the stylus from the record and swinging the arm to its beginning position for repeating the record upon the completion of playing the record, and means for initiating the action of the automatic means arranged and adapted to be operated by the arm when it is swung inwardly to a predetermined inward position by a spirallead-in groove on a record being played, and also arranged and adapted to be operated by the arm when it is swung backward due to a run-over groove of the eccentric type on a record being played.

21. An automatic phonograph of the class described adapted to operate with disk records having needle traversing grooves provided with different forms of termini formed therein, comprising a record turntable, means for rotating said turntable, reproducing mechanism including a tone arm provided with a groove following stylus, means for stopping the rotation of said turntable, and control means for said last-named means, said control means having a first part operated through the tone arm by one type of record and a second part operated through the tone arm by a different type of record.

22. An automatic phonograph adapted to operate with records having needle traversing grooves provided with spiral lead in termini and also with records having needle traversing grooves provided with eccentric termini, comprising a record turntable, means for driving said turntable, reproducing means including a swinging arm and a groove following stylus carried by the arm, means for rendering said driving means inoperative, and control means for said last-mentioned means, said control means having one part rendered active by said spiral lead in termini through the tone arm and a second part rendered active by said eccentric termini through the tone arm.

In testimony whereof, I have hereunto set my hand, this 10th day of August, 1926.

WILLIAM H. DAILY.